United States Patent
Rossmann et al.

(10) Patent No.: US 8,239,839 B2
(45) Date of Patent: Aug. 7, 2012

(54) ASYNCHRONY DEBUGGING USING WEB SERVICES INTERFACE

(75) Inventors: Albert Rossmann, Muhlstr (DE); Robert Heidasch, Eichendorffstr (DE)

(73) Assignee: SAP AG, Walldorf (DE)

( * ) Notice: Subject to any disclaimer, the term of this patent is extended or adjusted under 35 U.S.C. 154(b) by 1232 days.

(21) Appl. No.: 11/963,787

(22) Filed: Dec. 21, 2007

(65) Prior Publication Data

US 2011/0004790 A1    Jan. 6, 2011

(51) Int. Cl.
  *G06F 9/44* (2006.01)
(52) U.S. Cl. .......... 717/129; 717/124; 717/125
(58) Field of Classification Search .......... 717/125, 717/129
  See application file for complete search history.

(56) References Cited

U.S. PATENT DOCUMENTS

| | | | | |
|---|---|---|---|---|
| 5,394,544 | A * | 2/1995 | Motoyama et al. | 714/31 |
| 6,961,926 | B2 * | 11/2005 | Koyama | 717/129 |
| 7,404,178 | B2 * | 7/2008 | Cepulis | 717/124 |
| 7,634,759 | B2 * | 12/2009 | Calsyn et al. | 717/124 |
| 7,779,390 | B1 * | 8/2010 | Allavarpu et al. | 717/124 |
| 7,849,364 | B2 * | 12/2010 | Callender | 714/38.1 |
| 2001/0004766 | A1 * | 6/2001 | Koyama | 717/4 |
| 2005/0010880 | A1 * | 1/2005 | Schubert et al. | 716/4 |
| 2005/0028036 | A1 * | 2/2005 | Shibata | 714/38 |
| 2005/0060690 | A1 * | 3/2005 | Tung et al. | 717/129 |
| 2005/0066314 | A1 * | 3/2005 | Bates et al. | 717/129 |
| 2005/0183069 | A1 * | 8/2005 | Cepulis | 717/128 |
| 2006/0129988 | A1 * | 6/2006 | Calsyn et al. | 717/124 |
| 2006/0195894 | A1 * | 8/2006 | Nita et al. | 726/11 |
| 2006/0200701 | A1 * | 9/2006 | Callender | 714/38 |
| 2007/0168994 | A1 * | 7/2007 | Barsness et al. | 717/129 |
| 2009/0037775 | A1 * | 2/2009 | Chi et al. | 714/38 |
| 2009/0164981 | A1 * | 6/2009 | Heidasch et al. | 717/129 |
| 2011/0004790 | A1 * | 1/2011 | Rossmann et al. | 714/27 |

OTHER PUBLICATIONS

Gorlick, "Distributed Debugging and Monitoring on $5 a Day", Nov. 12, 1997, citeseerx.ist.psu.edu, total pages 9.*
Bates, "Distributed Debugging Tools for Heterogeneous Distributed Systems" 1998, retrived from <http://www.cin.ufpe.br/~redis/intranet/heterogeneidade/debugging.pdf>, pp. 308-315.*

* cited by examiner

*Primary Examiner* — don wong
*Assistant Examiner* — Marina Lee
(74) *Attorney, Agent, or Firm* — Mintz, Levin, Cohn, Ferris, Glovsky & Popeo, P.C.

(57) ABSTRACT

A system and method for debugging a running process of an application or component is disclosed. A debugging client has a user interface for receiving user commands to configure and control a debugging program. A debugging agent is resident in a local network area with the running process and has a direct connection with the running process. The debugging agent is configured to execute the debugging program to obtain debugging information on the running process, and to send the debugging information to the debugging client. A Web services communication link is established between the debugging client and the debugging agent for communicating signals to the debugging agent from the debugging client representing the user commands to configure and control the debugging program.

10 Claims, 2 Drawing Sheets

ASYNCHRONY DEBUGGING USING WEB SERVICES INTERFACE

BACKGROUND

This disclosure relates generally to enterprise software systems, and more particularly to asynchronous debugging of enterprise software using a Web services interface.

For software developers and sellers, there is often a need to analyze problems in a customer's system. Problems can be analyzed by debugging an application on the customer's site without transferring or installing a program integrated development environment (IDE) and source code. However, a debugging agent that performs problem analysis includes source code, and is typically located on the same machine or in the same network area as the process being debugged.

Typically, customers only allow very restricted access to their systems, and often treat any access as a security issue. Any access to a customer's system needs to fulfill high cryptographic standards. Many conventional schemes for maintaining a customer's system remotely do not adequately support access via a wide area network (WAN), particularly for a maintenance operation involving only a single step.

SUMMARY

In general, this document discusses an asynchronous debugging system and method that simplifies problem detection and analysis of applications or components by using a Web services interface. An asynchronous debugger using a Web services interface is disclosed that allows debugging or tracing of both local and remote systems running on different operating systems (OSs) and different technology (Java, ABAP, C#, etc.).

The debugging system provides debugging data without stopping execution of a running process being debugged, such as execution of a Java process or ABAP process. Thus, the debugging system enables intelligent, extended tracing with debugging information granularity. The debugging information can be obtained from data obtained from the process, even if the process or its host system is not running. Accordingly, "offline" debugging in the form of step execution or simulation of already-finished processes are possible.

In one aspect, a system for debugging a running process of an application or component is disclosed. the system includes a debugging client having a user interface for receiving user commands to configure and control a debugging program, and a debugging agent resident in a local network area with the running process and having a direct connection with the running process. The debugging agent is configured to execute the debugging program to obtain debugging information on the running process, and to send the debugging information to the debugging client. The system further includes a Web services communication link established between debugging client and the debugging agent for communicating signals to the debugging agent from the debugging client representing the user commands to configure and control the debugging program.

In another aspect, a method for debugging a running process of an application or component is disclosed. The method includes establishing a connection with the running process from a debugging client via a debugging agent. The connection includes a communication link between the debugging client and the debugging agent that employs Web services. The method further includes debugging the running process with a debugging process executed by the debugging agent, the debugging process being configured by the debugging client.

In yet another aspect, a system for debugging a running process of an application or component is presented. The system includes a debugging process that is configured and controlled by a debugging client and executed by a debugging agent in communication with the debugging client via a Web services connection, the debugging process being configured to debug the running process according to one or more breakpoints established by the debugging client and executed by the debugging agent.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
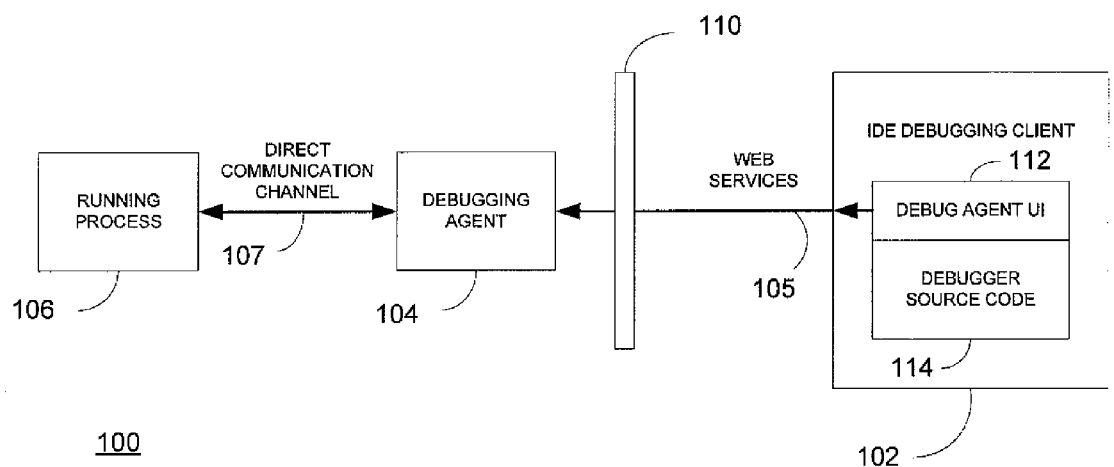
FIG. 1 illustrates a general architecture of an asynchronous debugging system.

This document describes a template based asynchronous debugging system and method. FIG. 1 illustrates a general architecture of an asynchronous debugging system 100. The debugging system 100 includes a debugging client 102 running in an IDE debugger that communicates asynchronously with a debugging agent 104 using a Web services connection 105. The communication is platform-independent, and therefore can be connected to any debugging agent 104 running in any operating system (OS), as well as be connected to any different system (e.g. Java, ABAP, C#, etc.).

The Web services connection 105 provides communication via one or more Web services. Each Web service is a piece of platform/system-independent, self-contained, self-describing application functionality that is designed and operates according to open Internet standards. According to a designated design and communication model, one application makes a Web service available for use (referred to as the service provider) and another application accesses and runs the provided service (referred to as the service consumer). Therefore, Web services can be used for communicating between different applications and software components that are written in different programming languages and running on different software or system platforms.

To overcome application and platform barriers, Web services are based on the following widely supported industry standards:

Standard communication protocols—Hypertext Transfer Protocol (HTTP) or Simple Mail Transfer Protocol (SMTP).

Standard data representation format—eXtensible Markup Language (XML) and XML using Simple Object Access Protocol (SOAP). SOAP is a protocol for exchanging XML-based documents via a network using a standard transport protocol, typically HTTP.

Standard service description language—Web Services Description Language (WSDL). WSDL is the language that is used to describe the public interface of a Web service. WSDL is used to define the service contract specification, which contains the interface description that is defined by the XML-based document. SOAP describes how to invoke a Web service that is described by the WSDL document.

Standard discovery language—Universal Description Discovery and Integration (UDDI). UDDI is a platform-independent protocol that enables applications and software components to look up (or "discover," in Web services terminology) available services in an XML-based service registry. UDDI is an industry initiative to standardize the discovery of Web services. UDDI defines a SOAP-based application programming interface (API) for querying centralized Web service repositories.

The debugging agent 104 is configured to communicate with the application or component running process 106 to be debugged via a direct communication channel 107, such as a socket connection. Accordingly, the debugging client 102 does not connect directly to the running process 106.

The debugging agent 104 is a program that connects to the running process 106 (e.g. Java process running on a Java Virtual Machine (JVM), ABAP process running on an APAP application server, C# process running on a Microsoft Common Runtime, etc.). In an exemplary implementation, the debugging agent 104 is a platform-specific (OS and runtime and/or process) agent or program that enables the connection to and control of the running process 106.

The connection between debugging client 102 and debugging agent 104 is a secure connection which uses a SSL (Secure Socket Layer) communication. This connection requires user authentication. The authenticated user is identified by the debugging agent 104 by client ID. Only an authenticated user can control and/or configure the debugging agent 104, such as transferring and activating a template based debugging breakpoint configuration, or in other words, a "breakpoint set" in the running process.

A template-based debugging configuration is defined for the asynchronous debugging system and method that can be transferred to the customer and activated in the customer's system. The configuration transfer and activation is done without stopping the process execution (e.g. execution of Java process, or ABAP process), and provides the configuration of both "hard" and "soft" breakpoints. A hard breakpoint stops the process execution, which is the normal behavior of a standard debugger. A "soft" breakpoint only temporarily stops the process execution, and can be used as an "intelligent" trace that enables a developer to execute a designated process or its simulation later. The hard and soft breakpoints are defined for the asynchronous debugger in debugging client, and a Web services interface is used to transfer the breakpoints to a debugging agent. That allows debugging or tracing of both local and remote systems running on different operating systems (OSs) and different technology (Java, ABAP, C#, etc.).

The debugging system 100 works asynchronously—the debugging client 102 uses the Web services to connect to the debugging agent 104 through a firewall 110. The debugging client 102 includes a debugging agent user interface 112 for maintaining breakpoints in the debugger source code 114, evaluating the process 106 data (online or offline) and controlling the process 106 execution.

Figure 2:
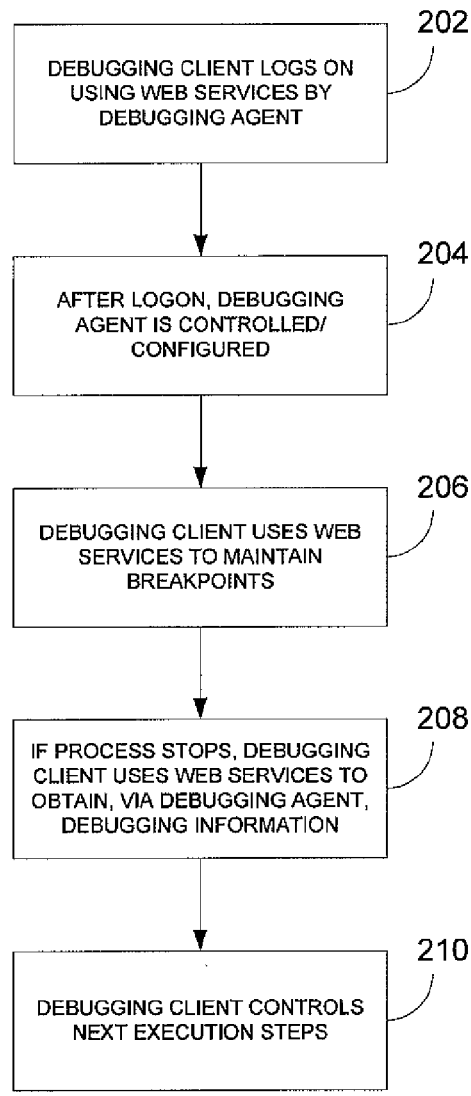
FIG. 2 is a flowchart of a method 200 in which a debugging client communicates with a debugging agent.

FIG. 2 is a flowchart of a method 200 in which a debugging client communicates with a debugging agent. At 202, the debugging client connects to a debugging agent using Web services provided by the debugging agent. This is a secure socket layer (SSL) communication link. After the debugging client is authenticated, at 204 the debugging agent can be controlled and configured through a user interface of the debugging client.

At 206, the debugging client uses Web services to maintain breakpoints in the process. The breakpoints can be set, deleted, or have conditions defined to them, i.e. times when the breakpoints will stop the process. At 208, if the process is stopped, the debugging client uses Web services to obtain, via the debugging agent, debugging information for analysis by the debugging client via the user interface and analytics executed by the debugging client. Debugging can be either "online" or "offline." Thus, the debugging client can evaluate results from the debugging information later. At 210, the debugging client controls the next execution steps of the process through the debugging agent, i.e. if the process should step in, step out, or run again.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A system for debugging a running process of an application or component, the system comprising:
   at least one processor; and
   a memory coupled to the at least one processor, the memory comprising one or more programs that cause the processor to perform operations comprising:
   receiving, by a user interface of a debugging client, user commands to configure and control a debugging program;
   establishing communication between the debugging client and a debugging agent via a Web services communication link comprising a secure socket layer communication link, the communication link established between the debugging client and the debugging agent being asynchronous, and independent of a software platform used at the debugging client and the debugging agent;
   causing authentication of the debugging client to the debugging agent via the secure socket layer communication link;
   transferring, after authentication of the debugging client, signals from the debugging client to the debugging agent representing the user commands to configure and control the debugging program by a template-based debugging configuration, the template-based debugging configuration comprising hard and soft breakpoints to create debugging information on the running process;
   receiving, from the debugging agent at the debugging client, the debugging information on the running process obtained by executing the debugging program, the debugging agent running locally to the running process and having a direct connection to the running process.

2. The system of claim 1, wherein the Web services link is further adapted for communicating signals to the debugging client from the debugging agent representing the debugging information.

3. The system of claim 1, wherein the debugging client is further adapted to analyze the debugging information.

4. The system of claim 1, wherein the direct connection between the debugging agent and the running process includes a socket connection.

5. A method for debugging a running process of an application or component, the method comprising:
   establishing a connection with the running process from a debugging client via a debugging agent, the connection including a communication link comprising a secure socket layer communication link between the debugging client and the debugging agent that employs Web services, the communication link established between the debugging client and the debugging agent being asynchronous, and independent of a software platform used at the debugging client and the debugging agent;
   causing authentication of the debugging client to the debugging agent via the secure socket layer communication link;

transferring, after authentication of the debugging client, signals from the debugging client to the debugging agent user commands to configure and control a debugging program by a template-based debugging configuration, the template-based debugging configuration comprising hard and soft breakpoints to create debugging information on the running process; and receiving from the debugging agent at the debugging client the debugging information on the running process obtained by executing the debugging program, the debugging agent running locally to the running process and having a direct connection to the running process.

6. The method of claim 5, further comprising maintaining, via the debugging client, breakpoints in the running process.

7. The method of claim 5, further comprising analyzing, with the debugging client, the debugging information.

8. A non-transitory computer readable medium containing executable instructions which when executed perform operations comprising:

receiving, by a user interface of a debugging client, user commands to configure and control a debugging program;

establishing communications between the debugging client and a debugging agent via a Web services communication link comprising a secure socket layer communication link, the communication link established between the debugging client and the debugging agent being asynchronous, and independent of a software platform used at the debugging client and the debugging agent;

causing authentication of the debugging client to the debugging agent via the secure socket layer communication link;

transferring, after authentication of the debugging client, signals from the debugging client to the debugging agent representing the user commands to configure and control the debugging program by a template-based debugging configuration, the template-based debugging configuration comprising hard and soft breakpoints to create debugging information on a running process;

receiving from the debugging agent at the debugging client the debugging information on the running process obtained by executing the debugging program, the debugging agent running locally to the running process and having a direct connection to the running process.

9. The non-transitory computer readable medium of claim 8, wherein the debugging agent is connected to the running process via direct socket connection.

10. The non-transitory computer readable medium of claim 8, wherein the Web services communicates signals between the debugging client and the debugging agent through a firewall.

* * * * *